United States Patent [19]

Hochberg

[11] Patent Number: 4,799,954

[45] Date of Patent: Jan. 24, 1989

[54] RECOVERY OF SILVER FROM PHOTOGRAPHIC FILM WITH HIGH SHEAR AND CAUSTIC

[75] Inventor: Jerome Hochberg, Wilmington, Del.

[73] Assignee: E. I. Du Pont de Nemours and Company, Wilmington, Del.

[21] Appl. No.: 168,541

[22] Filed: Mar. 8, 1988

Related U.S. Application Data

[63] Continuation of Ser. No. 14,711, Feb. 13, 1987, abandoned.

[51] Int. Cl.$^4$ .............................................. C22B 11/04
[52] U.S. Cl. .................................... 75/118 P; 134/28; 134/29; 134/34; 521/40; 521/46; 521/48
[58] Field of Search .................. 75/118 P; 134/28, 29, 134/34; 521/40, 46, 48

[56] References Cited

U.S. PATENT DOCUMENTS

| | | | |
|---|---|---|---|
| 1,637,990 | 8/1927 | Ellis et al. | 75/118 P |
| 3,652,466 | 3/1972 | Hittel et al. | 209/158 |
| 4,602,046 | 7/1986 | Buser et al. | 521/40 |
| 4,612,057 | 9/1986 | Buser et al. | 75/118 P |

Primary Examiner—Robert L. Stoll

[57] ABSTRACT

A process for the recovery of silver from exposed or unexposed photographic film using a caustic alkali solution at elevated temperatures with high shear.

5 Claims, No Drawings

RECOVERY OF SILVER FROM PHOTOGRAPHIC FILM WITH HIGH SHEAR AND CAUSTIC

This application is a continuation of application Ser. No. 014,711 filed Feb. 13, 1987 now abandoned.

BACKGROUND OF THE INVENTION

Photographic film generally comprises a polymeric base, a coating of adhesion-promoting polymer, typically a polyvinylidine chloride based resin and a light-sensitive emulsion layer, usually a silver halide dispersed in gelatin. A wide variety of techniques has been suggested for the recovery of the components of exposed or unexposed photographic film, to reclaim the component parts, particularly the silver present in the light-sensitive emulsion layer and the polymer base which is often polyethylene terephthalate. Such techniques have included the processes described in Hittel et al., U.S. Pat. No. 3,652,466, and Buser et al., U.S. Pat. Nos. 4,602,046 and 4,612,057. However, previous techniques have resulted in separated products which are not entirely satisfactory. For example, the process shown in Buser et al., U.S. Pat. No. 4,602,046 relates to the separation of one or more coating layers from a plastic based material using caustic alkali solution. Hittel et al., U.S. Pat. No. 3,652,466, uses caustic liquid to separate polyester based material from subsequently applied coatings. However, the Hittel et al. process is inefficient in the recovery of silver and clean polyethylene terephthalate from photographic film, and the Buser et al. patent is directed only to the separation of the polymeric layer from the base layer and not to the recovery of silver.

SUMMARY OF THE INVENTION

The instant invention provides an improved process for the recovery of silver from photographic films using a combination of elevated temperature, caustic treating solution, and high shear.

Specifically, the instant invention provides a process for the recovery of silver from photographic film having a polymeric base, a surface coating which provides adhesion for a silver emulsion layer, and a silver emulsion layer, which process comprises:
(a) mixing pieces of the film with a caustic alkali solution heated to a temperature of about from 140° F. to 200° F.,
(b) subjecting the mixture to conditions of high shear for a period sufficient to remove the surface coating from the base and to reduce the silver halides in the emulsion layer to metallic silver,
(c) separating the aqueous liquid containing the removed silver and surface coating from the film pieces, and
(d) acidifying the aqueous liquid to separate the metallic silver.

DETAILED DESCRIPTION OF THE INVENTION

The present process is applicable to the recovery of silver from photographic films of the type having a polymeric base layer, an adhesion promoting layer, and a silver-containing layer. Base layers used in such photographic films are often biaxially oriented polyesters such as polyethylene terephthalate, cellulose acetate, or nitrocellulose.

The photographic film is generally coated with an adhesion promoting layer such as a vinylidine chloride polymer or copolymer, which in turn, is coated with a light-sensitive emulsion layer containing a silver halide.

In accordance with the present invention, the photographic film, whether in an exposed and developed or unexposed state, is contacted with a caustic alkali solution. The caustic used can, for example, be sodium hydroxide or potassium hydroxide of which sodium hydroxide is preferred. The concentration of the solution should be at least about 7 wt. percent of the caustic, and maintained at a treatment temperature of about from 140° F. to 200° F.

The photographic film, in the hot caustic solution, is subjected to high shear. High shear is used in its conventional sense, that is, mixing sufficient to create turbulent as opposed to laminar flow within the treatment vessel. To promote high shear, the photographic film is preferably in the form of small pieces, so that the turbulence of the film pieces aids in the development of shear within the treatment vessel. Particularly preferred are pieces of film ranging in size from about 2 to about 30 millimeters in the longest dimension.

The high shear mixing in the caustic solution is carried out for a period sufficient to reduce the silver halides in the emulsion layer to metallic silver. The mechanism of the chemical conversion is not fully understood, but is believed to be a function of the caustic in combination with the gelatin used in the light-sensitive emulsion layer. The period for treatment will necessarily vary with the concentration of silver in the film, the concentration of caustic, the specific temperature used, and other conditions such as the concentration of the film being treated in the caustic solution. However, in general, substantially complete conversion of the silver halides to metallic silver will be complete within a period of about from 15 to 45 minutes. The conversion to metallic silver is generally accompanied by a color change.

After conversion of the silver halide in the emulsion layer to metallic silver, the aqueous liquid containing the metallic silver is removed. This liquid is then acidified to facilitate the precipitation and removal of the metallic silver. Any convenient acid can be used for the acidification, of which sulfuric acid has been found to be particularly satisfactory, and is accordingly preferred. The removal of the silver metal is further facilitated by acidification to a pH of less than about four.

It was previously thought that treatment with caustic would convert the silver halides as found in the photographic film to silver oxide rather than elemental silver. It was assumed, for example, by those skilled in the art, that the Hittel et al. process described in U.S. Pat. No. 4,652,466, in which caustic was used with low shear, that the deposition of silver on processing equipment was a result of metal interchange from the solution and the treatment vessels.

The process of the instant invention is applicable to both exposed and unexposed photographic film. The production of metallic silver from the process, as opposed to a silver halide or oxide, not only results in the removal of metallic silver in an efficient manner, but provides an aqueous residue having a very low concentration of silver, for example, less than about five parts per million, which can be disposed in an environmentally safe manner. Moreover, the high shear conditions used permit removal of the metallic silver in an efficient manner as opposed to the Hittel et al. process in which metallic silver was often found to coat the walls of the treatment vessel.

The present invention is further illustrated by the following specific example in which parts and percentages are by weight unless otherwise indicated.

EXAMPLE

Silver was removed from photographic film having a biaxially oriented polyester base, polyvinylidine chloride adhesion promoting layer, and photographic gelatin containing silver halide. The photographic film was in the form of flake having a maximum dimension of about 25 mm.

Four thousand parts of the flake were introduced into a high shear mixer in addition to 4700 parts of water maintained at a temperature of 150° F. The agitator was started and 400 parts of sodium hydroxide in flake form were added to the mixture to provide a caustic solution of 8.5% sodium hydroxide. The treatment vessel was heated by steam to a temperature of 195° F., and mixing under high shear was continued for about 30 minutes.

The contents of the treatment vessel were emptied into a second treatment vessel and the original vessel flushed with fresh water until clean. Forty-five hundred parts of water were added to the second treatment vessel and the mixture agitated for a period of two minutes. Four hundred parts of sulfuric acid was added to the second treatment vessel to neutralize the treatment mixture to a pH of about 7.

The silver suspended in water is separated by means of a continuous centrifuge in which the polyester flake is retained on a rotating screen in a centrifugal filter while rinsing. The filter permits passage of the elemental silver which is suspended in the rinse water and collection of the wet polyester flake.

Rinse water was collected in a holding tank and sulfuric acid was added to the tank to adjust the pH to about three, resulting in the flocculation of the silver metal. Silver flocculates in the rinse water upon acidification, since at a pH of about three the gelatin used in the photographic film substantially loses its dispersing capacity for the silver.

The rinse water from the holding tank was pumped to two cone-bottom tanks and allowed to settle for one hour. The acidic aqueous solution was removed and found to still exhibit a pH of about three. Silver metal sludge is recovered from the bottom of the cone-bottom tank. The sludge comprises the silver metal, gelatin and adhesion promoting polymer. This sludge is then further treated using silver processing techniques well known in the art to separate the silver metal from the other sludge components.

The clean polyester flake was removed from the centrifuge and dried by conventional means.

I claim:

1. A process for the recovery of metallic silver from photographic film having a polymeric base, a surface coating which provides adhesion for a silver emulsion layer, and a silver emulsion layer containing gelatin, which process comprises:
   (a) mixing pieces of the film with a caustic alkali solution heated to a temperature of about from 140° F. to 200° F.,
   (b) subjecting the mixture to conditions of high shear for a period sufficient to remove the surface coating from the base and to substantially completely reduce the silver halides in the emulsion layer to metallic silver,
   (c) separating the aqueous liquid containing the removed silver and surface coating from the film pieces, and
   (d) acidifying the aqueous liquid to separate the metallic silver.

2. A process of claim 1 wherein the caustic consists essentially of sodium hydroxide.

3. A process of claim 1 wherein the caustic mixture is maintained at a temperature of about from 180° F. to 200° F.

4. A process of claim 1 wherein the base of the photographic film is polyethylene terephthalate.

5. A process of claim 1 wherein the photographic film is comminuted to flake of about from 2 to 30 millimeters in the longest dimension.

* * * * *